United States Patent [19]

Mizuno et al.

[11] Patent Number: 5,326,733
[45] Date of Patent: Jul. 5, 1994

[54] SILICON NITRIDE SINTERED PRODUCT EXCELLENT IN WEAR RESISTANCE

[75] Inventors: Ken-ichi Mizuno; Yo Tajima, both of Aichi, Japan

[73] Assignee: NGK Spark Plug Co., Ltd., Aichi, Japan

[21] Appl. No.: 986,563

[22] Filed: Dec. 7, 1992

[30] Foreign Application Priority Data

Dec. 5, 1991 [JP] Japan .................. 3-349227

[51] Int. Cl.5 .............................. C04B 35/58
[52] U.S. Cl. ........................ 501/97; 501/98
[58] Field of Search ................... 501/97, 98

[56] References Cited

U.S. PATENT DOCUMENTS

| | | | |
|---|---|---|---|
| 4,449,989 | 5/1984 | Sarin et al. | 501/97 |
| 4,499,192 | 2/1985 | Shimamori et al. | 501/97 |
| 4,764,490 | 8/1988 | Yamakaw et al. | 501/98 |
| 4,769,350 | 9/1988 | Nishioka et al. | 501/97 |
| 4,880,756 | 11/1989 | Urashima et al. | 501/97 |
| 5,089,448 | 2/1992 | Kawakami et al. | 501/97 |

FOREIGN PATENT DOCUMENTS 0356244 2/1990 European Pat. Off. .
57-157466 6/1989 Japan .

OTHER PUBLICATIONS

Japanese Patent Abstract 83184156, 1983.
Chemical Abstracts, vol. 103, No. 10, Sep. 1985, p. 258, abstract No. 75294c, Columbus, Ohio, US; & JP-A-60 77 174 (Kubota Ltd.) Jan. 5, 1985.
WO-A-8 703 866 (Research Development Co. of Japan et al.) Jul. 1987.
American Ceramic Society Bulletin, vol. 65, No. 9, Sep. 1986, Columbus, Ohio, US, pp. 1311-1315, E. Tani et al., "Gas-pressure sintering of Si3N4 with concurrent addition of A1203 and 5 wt. % rare earth oxide", FIGS. 1-4, Table 1.
Chemical Abstracts, vol. 110, No. 8, Apr. 17, 1989, Columbus, Ohio, US; Abstract No. 140367q, S. Kosaka et al., "High-density silicon nitride sintered ceramics with high temperatures" p. 225; Abstract & JP-A-63 252 967 (Kyocera Corp.), Oct. 20, 1988.

*Primary Examiner*—Mark L. Bell
*Assistant Examiner*—Deborah Jones
*Attorney, Agent, or Firm*—Sughrue, Mion, Zinn, Macpeak & Seas

[57] ABSTRACT

A silicon nitride sintered product for use in cutting tools and the like which has silicon nitride as a predominant phase, and comprises 0.1 to 1% by weight of Al as calculated on the basis of $Al_2O_3$, the total amount of sintering aid constituents other than Al being 6% by weight or less on the oxide basis, the content of the grain boundary glassy phase being 8% by volume or less. The silicon nitride sintered product preferably has a relative density of 99% or more.

3 Claims, No Drawings

SILICON NITRIDE SINTERED PRODUCT EXCELLENT IN WEAR RESISTANCE

FIELD OF THE INVENTION

The present invention relates to a silicon nitride sintered product suitable for use in a cutting tool, a wear-resistant tool, a wear-resistant component and a reciprocating component. The term, silicon nitride used herein means $Si_3N_4$, $\beta'$-sialon represented by $Si_{6-z}Al_zO_zN_{8-z}$ (Z is 0 to 4.2) and the like.

BACKGROUND OF THE INVENTION

Silicon nitride sintered products are ceramics which are extremely hard and exhibit excellent wear resistance as well as strength and toughness. Therefore, silicon nitride sintered products have been used in cutting tools and wear-resistant components.

In JP-A-1-157466 (1989) (the term "JP-A" as used herein means an "unexamined published Japanese patent application") which corresponds to U.S. Pat. No. 4,880,756 a silicon nitride sintered product in which Mg, Zr, Al or the like is used as a sintering aid is proposed as a product having excellent wear resistance. This prior art teaching is based on the finding that Al and the like contribute to product densification by forming, together with Si, N and O, a liquid phase in the interstices between $Si_3N_4$ grains during firing, and also bond $Si_3N_4$ grains by glassification during cooling to avoid debonding of $Si_3N_4$ grains during abrasion, thereby enhancing toughness. In some cases, a wear-resistant film may be formed on the surface of the base material of a cutting tool, giving it excellent strength and toughness so that the wear resistance is improved.

However, in these cutting tools, despite the wear-resistant components and the reciprocating components, still further alleviation of wear is required to prolong tool life, since the techniques described in JP-A-1-157466 do not satisfy such requirements. Although it was possible to obtain the sintered products which exhibit excellent defect resistance by improving the strength and toughness, there was previously no specific means for improving the wear resistance, since the relationship between wear resistance and mechanical properties was not known.

SUMMARY OF THE INVENTION

The present inventors have found, after thorough studies, that reducing the amount of the grain boundary glassy phase is unexpectedly effective in improving wear resistance.

The present invention has been made based on such knowledge.

The object of the present invention is to provide a silicon nitride sintered product which exhibits excellent wear resistance.

According to the present invention, a silicon nitride sintered product is provided which exhibits excellent wear resistance, said product having silicon nitride as a predominant phase and comprising 0.1 to 1% by weight of Al as calculated on the basis of $Al_2O_3$, the total amount of the sintering aid constituents other than Al being 6% by weight or less on the oxide basis, the content of the grain boundary glassy phase being 8% by volume or less.

In a preferred embodiment of the present invention, the relative density of the product is 99% or more.

DETAILED DESCRIPTION OF THE INVENTION

The operation of the present invention is described below.

Our studies regarding the wear resistance of the cutting tools have revealed the following facts:

It is said that generally the temperature of the edge of the blade of cutting tool during cutting reaches as high as 800° C. or more, although this depends on the workpiece and the cutting conditions. Therefore, in order to improve the wear resistance of cutting tools, it is important that the cutting tools have good heat resistance and chemical stability.

The grain boundary phase in the silicon nitride sintered product is present as a crystal phase or an amorphous glassy phase comprising the sintering aid constituents such as Al, Y, Mg, Zr, Ce, Yb, Er, Pr, or oxides thereof, as well as Si, N and O. The amorphous glassy phase has poor heat resistance and poor corrosion resistance as compared with silicon nitride. Therefore, the amount and composition of the grain boundary glassy phase greatly affect the heat resistance and chemical stability of the sintered product.

In view of the above, if the amount of a sintering aid to be used can be reduced by the use of a sintering aid system having such an excellent sintering capability as to enable the product densification even with a small amount thereof, sufficient product densification and improved wear resistance of the product can be attained even though the amount of the grain boundary glassy phase is small. The present inventors have found that an Al constituent satisfies these requirements. Further, the addition of a very small amount of an Al compound, especially $Al_2O_3$, as a sintering aid results in the improvement of sinterability of the green body for the product, and thus the reduction of the contents of the other sintering aid constituents, whereby the reduction of the amount of the grain boundary glassy phase can be attained. The addition of a very small amount of the above Al compound also results in resistance of the grain growth of the silicon nitride grains in the sintered product, and thus provides a finer structure, whereby wear resistance can be improved.

If $Al_2O_3$ is added as a sintering aid, Al and O atoms in $Al_2O_3$ are substituted with a part of Si and N atoms in $Si_3N_4$, respectively to form $\beta'$-sialon.

In order to impart good wear resistance to the wear-resistant components and the reciprocating components in addition to the cutting tools, it is important to improve the abrasive wear resistance of the material. It has been found through various studies that a reduction in the amount of the grain boundary phase in the silicon nitride sintered product and the reduced grain size of the silicon nitride grains contribute to the improvement of the abrasive wear resistance. Also, it has been found that the addition of $Al_2O_3$ as a sintering aid results in finer silicon nitride grains in the sintered product.

In the present invention, in order to obtain a silicon nitride sintered product which has improved heat resistance, chemical stability and abrasive wear resistance and which exhibits excellent wear resistance, it is essential to make the content of the grain boundary glassy phase 8% by volume or less and to include 0.1 to 1% by weight of Al as calculated on the basis of $Al_2O_3$.

If the content of the grain boundary glassy phase exceeds 8% by volume, the wear resistance deteriorates. When the sintered product is used in the cutting tools, it is especially preferred that the content of the grain boundary glassy phase is 6% by volume or less. However, if the content is less than 3% by volume, the toughness deteriorates, which may result in the deterioration of the defect resistance of the sintered product.

An amount of Al is preferably 0.1 to 1% by weight, the most preferably 0.3 to 0.7% by weight as calculated on the basis of $Al_2O_3$.

If the content of Al is less than 0.1% by weight, the results that the sintering aid is intended to accomplish cannot be attained, nor can the finer structure of the sintered product be obtained. If the content of Al exceeds 1% by weight, the thermal conductivity of the sintered product is reduced, and thus the temperature of the edge of the cutting tool blade increases to a greater degree during cutting when the sintered product is used for the cutting tool, whereby the wear loss is increased.

As the density of the silicon nitride sintered product increases, the wear resistance increases as well. Thus, the relative density of the sintered product is preferably 99% or more. If the relative density is less than 99%, a pore of 1% or more remains in the sintered product, which causes not only the deterioration of the chipping resistance but also the deterioration of wear resistance of the cutting tool made from the sintered product.

The sintering aids in addition to $Al_2O_3$ must be those which have a high sintering capability, so as to effect the sintering even with a small amount thereof. Examples of such sintering aids include, preferably, Mg, Zr and Ce. As these constituents, there are used oxides, or the materials which can be converted to oxides during a firing process.

In order to achieve a relative density of 99% or more in the sintering process, sintering under a pressurized atmosphere is carried out as a secondary sintering step after an atmospheric sintering step is carried out. The firing temperature used in both the atmospheric sintering and the sintering under a pressurized atmosphere ranges from 1600° C. to 1900° C., preferably from 1650° C. to 1850° C., and most preferably from 1700° C. to 1800° C. The secondary sintering is carried out under a pressurized atmosphere having a partial nitrogen pressure of 10 atm or more. Examples of the sintering under a pressurized atmosphere which can be used in the present invention include sintering under hot isostatic press (HIP) and gas pressure sintering (GPS).

The present invention is hereinafter described in greater detail with reference to examples, which are not to be construed as limiting the scope thereof.

EXAMPLES $Si_3N_4$ powder having an average particle diameter of 0.7 μm, an α rate of 98% and a specific surface area of 10 m$^2$/g; and as sintering aids, $Al_2O_3$ powder having a specific surface area of 10 m$^2$/g, MgO powder having a specific surface area of 4 m$^2$/g, $ZrO_2$ powder having a specific surface area of 14 m$^2$/g and $CeO_2$ powder having a specific surface area of 8 m$^2$/g, and optionally $Yb_2O_3$ powder having a specific surface area of 9 m$^2$/g, $Er_2O_3$ powder having a specific surface area of 9 m$^2$/g or $Pr_6O_{11}$ powder having a specific surface area of 8 m$^2$/g were added at proportions shown in Table 1, and dried. Then, the resulting powder mixtures were pressed in molds under a pressure of 2 ton/cm$^2$, and subjected to a primary firing process at 1600° to 1750° C. (held under an atmospheric pressure of $N_2$ for 2 hours) followed by a secondary firing process under $N_2$ atmosphere of 100 atm, to give silicon nitride sintered products.

TABLE 1

| Sample No. | Composition (% by weight) | | | | | | | Remarks |
|---|---|---|---|---|---|---|---|---|
| | $Si_3N_4$ | Sintering aid constituents | | | | | | |
| | | $Al_2O_3$ | MgO | $ZrO_2$ | $CeO_2$ | Others | | |
| 1 | 98.8 | 0.3 | 0.3 | 0.3 | 0.3 | — | — | Within the |
| 2 | 98.3 | 0.5 | 0.5 | 0.2 | 0.5 | — | — | scope of |
| 3 | 96.9 | 0.1 | 1.0 | 1.0 | 1.0 | — | — | the present |
| 4 | 97.0 | 0.9 | 1.0 | 0.6 | 0.5 | — | — | invention |
| 5 | 93.5 | 0.5 | 2.0 | 2.0 | 2.0 | — | — | |
| 6 | 96.9 | 0.5 | 1.0 | 0.6 | — | $Yb_2O_3$ | 1.0 | |
| 7 | 96.0 | 0.7 | 0.8 | 1.0 | — | $Pr_6O_{11}$ | 1.5 | |
| 8 | 97.3 | 0.3 | 0.6 | 0.8 | — | $Er_2O_3$ | 1.0 | |
| 9 | 98.8 | — | 0.5 | 0.2 | 0.5 | — | — | Comparative |
| 10 | 90.5 | 0.5 | 3.0 | 3.0 | 3.0 | — | — | Examples |
| 11 | 87.5 | 0.5 | 4.0 | 4.0 | 4.0 | — | — | |
| 12 | 84.5 | 0.5 | 5.0 | 5.0 | 5.0 | — | — | |
| 13 | 89.8 | 0.2 | 5.0 | 5.0 | — | — | — | |
| 14 | 96.3 | 2.5 | 0.5 | 0.2 | 0.5 | — | — | |

The amount of the grain boundary glassy phase, the relative density, and the wear resistance when used as a cutting tool were determined on the obtained silicon nitride sintered products. The results of the determinations are shown in Table 2.

The sintering conditions and the methods for the measurement of the respective properties are discussed below.

Sintering Conditions

The primary firing: $N_2$ 1 atm, 1600° to 1750° C., 2 hours

The secondary firing: $N_2$ 100 atm, 1800° C., 2 hours

Methods for Measurements (1) Amount of the Grain Boundary Glassy Phase

A particular sintered product was subjected to mirror polishing.

Then, the proportion of the area occupied by the grain boundary phase in the product was measured by observation using a SEM (scanning electron microscope). The results of the measurement were designated as the amount of the grain boundary glassy phase.

(2) Relative Density

The density of each particular sintered product was measured by the Archimedean Method. The relative density of the product was determined by means of the equation as set forth below. In determining the relative density, completely densified products were prepared by the process comprising charging approximately 10 g of composition powder having the same compositions as those of the respective sintered products into a hollow cylinder made of carbon having 20 mmH×20 mmD, hot-pressing thereof under 200 Kgf/cm² pressure, and sintered at 1800° C. for 1 hour.

The sintered products, and completely densified products, thus formed, were selected, in which no pores were found by observation at 200 magnification using a metallurgical microscope after the products were subjected to mirror polishing and in which no fine pores on the order of microns were found by observation at 2000 to 5000 magnifications using a SEM.

Relative Density (%) = (Density of Sintered Product/Density of Completely Densified Product Having Same Composition) × 100

(3) Wear Resistance

Flank wear width $V_B$ was shown as a maximum abrasion loss, which was measured by using a test piece formed by processing a particular sintered product into chips specified as SNGN432 to machine a cutting material (JIS FC23), and cutting conditions such as a cutting speed of 100 m/min, a feed rate of 0.1 mm/rev, a depth of cut of 1.0 mm and a cutting time of 30 minutes in dry cutting.

TABLE 2

| Sample No. | Relative Density (%) | Amount of Grain Boundary Glassy Phase (vol %) | Wear Resistance $v_B$ (mm) | Remarks |
| --- | --- | --- | --- | --- |
| 1 | 99.5 | 3.6 | 0.21 | Within the |
| 2 | 100 | 3.8 | 0.22 | scope of |
| 3 | 100 | 5.0 | 0.26 | the present |
| 4 | 100 | 5.1 | 0.27 | invention |
| 5 | 100 | 7.1 | 0.36 | |
| 6 | 100 | 4.8 | 0.24 | |
| 7 | 100 | 5.5 | 0.31 | |
| 8 | 100 | 4.2 | 0.28 | |
| 9 | 92.0 | 4.1 | 0.61 | Comparative |
| 10 | 100 | 8.7 | 0.48 | Examples |
| 11 | 100 | 10.4 | 0.63 | |
| 12 | 100 | 12.5 | 0.70 | |
| 13 | 100 | 9.3 | 0.52 | |
| 14 | 99.2 | 4.8 | 0.56 | |

As can be seen from Table 2, the sintered products according to the present invention have excellent cutting properties such as $V_B$ values of 0.4 mm or less for wear resistance. In contrast, Sample No. 9 does not contain $Al_2O_3$ and has poor sinterability, resulting in the attainment of a relative density of as low as 99% or less and poor wear resistance. Sample Nos. 10 to 13 have an amount of the grain boundary glassy phase of more than 8% by volume. Consequently, they have poor wear resistance in spite of their sufficient densification, as is shown by their having a relative density of 100%. Further, sufficient wear resistance is not attained in Sample No. 14, which has an excessive content of $Al_2O_3$.

In the silicon nitride sintered products according to the present invention, wherein the amount of the grain boundary glassy phase is 8% by volume or less and wherein Al is contained in an amount of 0.1 to 1% by weight as calculated on the basis of $Al_2O_3$, excellent wear resistance can be attained as is illustrated by the above-described examples.

While the present invention has been described in detail hereinabove based on the specific embodiments thereof, it will be apparent to one skilled in the art that various changes and modifications can be made without departing from the spirit and scope of the present invention.

What is claimed is:

1. A silicon nitride sintered product, consisting essentially of:
   (i) silicon nitride as a predominant phase,
   (ii) 0.1 to 1% by weight of Al as calculated on the basis of $Al_2O_3$,
   (iii) an amount greater than 0 and up to 6% by weight, on an oxide basis, of a sintering aid constituent consisting essentially of Mg, Zr, and at least one member selected from the group consisting of Ce, Yb, Er, and Pr, or oxides thereof wherein the grain boundary glassy phase content of said product is 8% by volume or less.

2. The silicon nitride sintered product according to claim 1, wherein the relative density of said product is 99% or more.

3. The silicon nitride sintered product according to claim 1, wherein the grain boundary glassy phase content of said product is 3% to 6% by volume.

* * * * *